(12) United States Patent
Chen et al.

(10) Patent No.: US 12,245,286 B2
(45) Date of Patent: Mar. 4, 2025

(54) SLICE BASED RANDOM ACCESS CHANNEL CONFIGURATIONS

(71) Applicant: Apple Inc., Cupertino, CA (US)

(72) Inventors: Yuqin Chen, Beijing (CN); Dawei Zhang, Saratoga, CA (US); Fangli Xu, Beijing (CN); Haijing Hu, Los Gatos, CA (US); Naveen Kumar R. Palle Venkata, San Diego, CA (US); Sethuraman Gurumoorthy, San Ramon, CA (US); Srirang A. Lovlekar, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/755,590

(22) PCT Filed: May 10, 2021

(86) PCT No.: PCT/CN2021/092739
§ 371 (c)(1),
(2) Date: May 3, 2022

(87) PCT Pub. No.: WO2022/236569
PCT Pub. Date: Nov. 17, 2022

(65) Prior Publication Data
US 2024/0179745 A1    May 30, 2024

(51) Int. Cl.
*H04W 74/0833* (2024.01)
*H04W 48/16* (2009.01)
*H04W 48/18* (2009.01)

(52) U.S. Cl.
CPC ....... *H04W 74/0833* (2013.01); *H04W 48/16* (2013.01); *H04W 48/18* (2013.01)

(58) Field of Classification Search
CPC . H04W 74/0833; H04W 48/16; H04W 48/18; H04W 74/0841; H04W 74/008;
(Continued)

(56) References Cited

U.S. PATENT DOCUMENTS

2017/0367120 A1   12/2017  Murray et al.
2019/0215761 A1    7/2019  Hirata et al.
(Continued)

FOREIGN PATENT DOCUMENTS

EP          3457799          3/2019
WO   WO 2021/018472 A1 *   2/2021
WO   WO 2022/151153 A1 *   7/2022

OTHER PUBLICATIONS

U.S. Appl. No. 63/137,614 (Year: 2021).*
(Continued)

*Primary Examiner* — Rushil P. Sampat
(74) *Attorney, Agent, or Firm* — Fay Kaplun & Marcin, LLP

(57) ABSTRACT

A user equipment (UE) is configured to receive slice based RACH configuration information, wherein the selecting is based on the slice based RACH configuration information, determine that a first network slice and a second different network slice are in operation when the UE is in a radio resource control (RRC) connected state, initiate an access stratum (AS) triggered random access channel (RACH) procedure, select RACH resources associated with one of the first network slice or the second network slice for the RACH procedure based on the slice based RACH configuration information and transmit a signal over the RACH using the selected RACH resources.

18 Claims, 8 Drawing Sheets

(58) Field of Classification Search
CPC ..... H04W 74/02; H04W 76/20; H04W 48/02; H04W 74/006
See application file for complete search history.

(56) References Cited

U.S. PATENT DOCUMENTS

| | | | |
|---|---|---|---|
| 2020/0178162 A1* | 6/2020 | Wallentin | H04W 48/16 |
| 2022/0183081 A1* | 6/2022 | Tao | H04W 74/02 |
| 2023/0092926 A1* | 3/2023 | Fu | H04W 48/18 370/329 |
| 2024/0015798 A1* | 1/2024 | Cheng | H04W 74/0833 |
| 2024/0064817 A1* | 2/2024 | Löhr et al. | H04W 74/0833 |

OTHER PUBLICATIONS

Xiaomi, "Visibility of Slicing to UE"; 3GPP TSG-RAN WG2 #97bis, R2-1702529, Apr. 3, 2017, 5 sheets.

Nokia et al., "RACH prioritisation for slices", 3GPP TSG-RAN WG2 Meeting 113bis Electronic, R2-2103548, Apr. 20, 2021, 4 sheets.

Huawei et al., "Discussion on slice based RACH configuration", 3GPP TSG-RAN WG2 Meeting #113bis-e, R2-2104005, Apr. 20, 2021, 4 sheets.

CATT, "Analysis on slice based RACH configuration", 3GPP TSG-RAN WG2 Meeting #113bis, R2-2104019, Apr. 20, 2021, 3 sheets.

Apple, "Discussion on slice based RACH and cell barring", 3GPP TSG-RAN WG2 Meeting #112-e, R2-2009474, Nov. 13, 2020, 2 sheets.

* cited by examiner

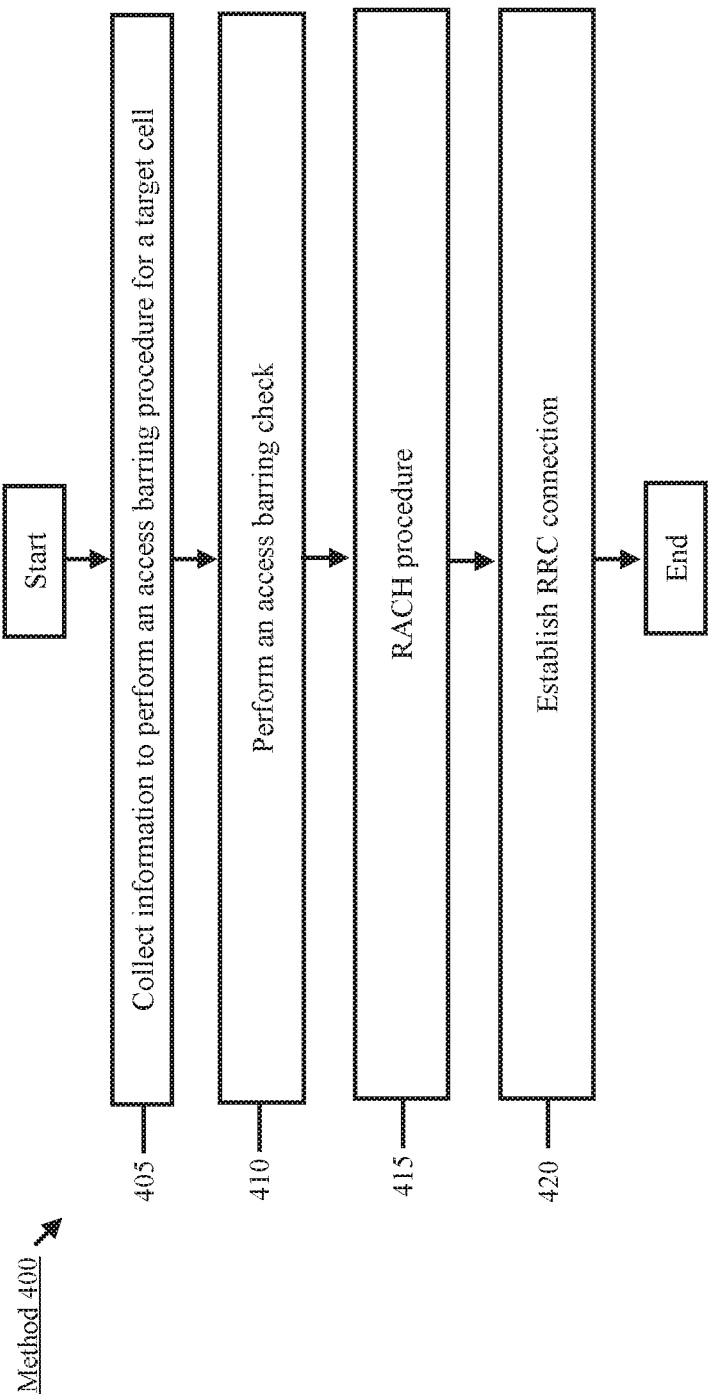

Access Identities

| Access Identity number | UE configuration |
|---|---|
| 0 | UE is not configured with any parameters from this table |
| 1 (NOTE 1) | UE is configured for Multimedia Priority Service (MPS). |
| 2 (NOTE 2) | UE is configured for Mission Critical Service (MCS). |
| 3-10 | Reserved for future use |
| 11 (NOTE 3) | Access Class 11 is configured in the UE. |
| 12 (NOTE 3) | Access Class 12 is configured in the UE. |
| 13 (NOTE 3) | Access Class 13 is configured in the UE. |
| 14 (NOTE 3) | Access Class 14 is configured in the UE. |
| 15 (NOTE 3) | Access Class 15 is configured in the UE. |

Fig. 5

Access Categories

| Access Category number | Conditions related to UE | Type of access attempt |
|---|---|---|
| 0 | All | MO signalling resulting from paging |
| 1 (NOTE 1) | UE is configured for delay tolerant service and subject to access control for Access Category 1, which is judged based on relation of UE's HPLMN and the selected PLMN. | All except for Emergency |
| 2 | All | Emergency |
| 3 | All except for the conditions in Access Category 1. | MO signalling on NAS level resulting from other than paging |
| 4 | All except for the conditions in Access Category 1. | MMTEL voice (NOTE 3) |
| 5 | All except for the conditions in Access Category 1. | MMTEL video |
| 6 | All except for the conditions in Access Category 1. | SMS |
| 7 | All except for the conditions in Access Category 1. | MO data that do not belong to any other Access Categories (NOTE 4) |
| 8 | All except for the conditions in Access Category 1 | MO signalling on RRC level resulting from other than paging |
| 9-31 | | Reserved standardized Access Categories |
| 32-63 (NOTE 2) | All | Based on operator classification |

Fig. 6

SLICE BASED RANDOM ACCESS CHANNEL CONFIGURATIONS

BACKGROUND

A user equipment (UE) may connect to a network that includes multiple network slices. Generally, a network slice refers to an end-to-end logical network that is configured to provide a particular service and/or possesses particular network characteristics. Each network slice may be isolated from one another but run on a shared physical network infrastructure. Thus, each network slice may share network resources but facilitate different functionality.

The UE may camp on a cell of the network to access one or more network slices. However, there may be scenarios in which a target cell does not support a network slice the UE intends to utilize. To enable fast access to a cell supporting the intended network slice, slice specific random access channel (RACH) configurations and/or access barring mechanisms may be implemented.

SUMMARY

Some exemplary embodiments are related to a processor of a user equipment (UE) configured to perform operations. The operations include receiving slice based RACH configuration information, wherein the selecting is based on the slice based RACH configuration information, determining that a first network slice and a second different network slice are in operation when the UE is in a radio resource control (RRC) connected state, initiating an access stratum (AS) triggered random access channel (RACH) procedure, selecting RACH resources associated with one of the first network slice or the second network slice for the RACH procedure based on the slice based RACH configuration information and transmitting a signal over the RACH using the selected RACH resources.

Other exemplary embodiments are related to a processor of a user equipment (UE) configured to perform operations. The operations include collecting information to perform an access barring procedure corresponding to a cell, wherein the information includes an access identity of the UE, performing the access barring procedure using the information and performing a random access channel (RACH) procedure with the cell, wherein the physical random access channel (PRACH) resources for the RACH procedure are selected based on an association between the access identity and a slice group.

Still further exemplary embodiments are related to a processor of a user equipment (UE) configured to perform operations. The operations include collecting information to perform an access barring procedure corresponding to a cell, performing the access barring procedure using the information, identifying a collision between a slice specific random access prioritization and a legacy random access prioritization and performing a random access channel (RACH) procedure with the cell.

Additional exemplary embodiments are related to a user equipment (UE) having a transceiver configured to communicate with a network and a processor communicatively coupled to the transceiver and configured to perform operations. The operations include receiving slice based RACH configuration information, wherein the selecting is based on the slice based RACH configuration information, determining that a first network slice and a second different network slice are in operation when the UE is in a radio resource control (RRC) connected state, initiating an access stratum (AS) triggered random access channel (RACH) procedure, selecting RACH resources associated with one of the first network slice or the second network slice for the RACH procedure based on the slice based RACH configuration information and transmitting a signal over the RACH using the selected RACH resources.

Further exemplary embodiments are related to a user equipment (UE) having a transceiver configured to communicate with a network and a processor communicatively coupled to the transceiver and configured to perform operations. The operations include collecting information to perform an access barring procedure corresponding to a cell, wherein the information includes an access identity of the UE, performing the access barring procedure using the information and performing a random access channel (RACH) procedure with the cell, wherein the physical random access channel (PRACH) resources for the RACH procedure are selected based on an association between the access identity and a slice group.

Other exemplary embodiments are related to a user equipment (UE) having a transceiver configured to communicate with a network and a processor communicatively coupled to the transceiver and configured to perform operations. The operations include collecting information to perform an access barring procedure corresponding to a cell, performing the access barring procedure using the information, identifying a collision between a slice specific random access prioritization and a legacy random access prioritization and performing a random access channel (RACH) procedure with the cell.

BRIEF DESCRIPTION OF THE DRAWINGS

FIG. 4 shows a method for implementing various exemplary techniques related to slice based random access channel (RACH) configurations and/or access barring mechanisms.

FIG. 5 shows an example of standardized access identities arranged by access identity number.

FIG. 6 shows an example of standardized access categorizes arranged by access category number.

DETAILED DESCRIPTION

Figure 1:
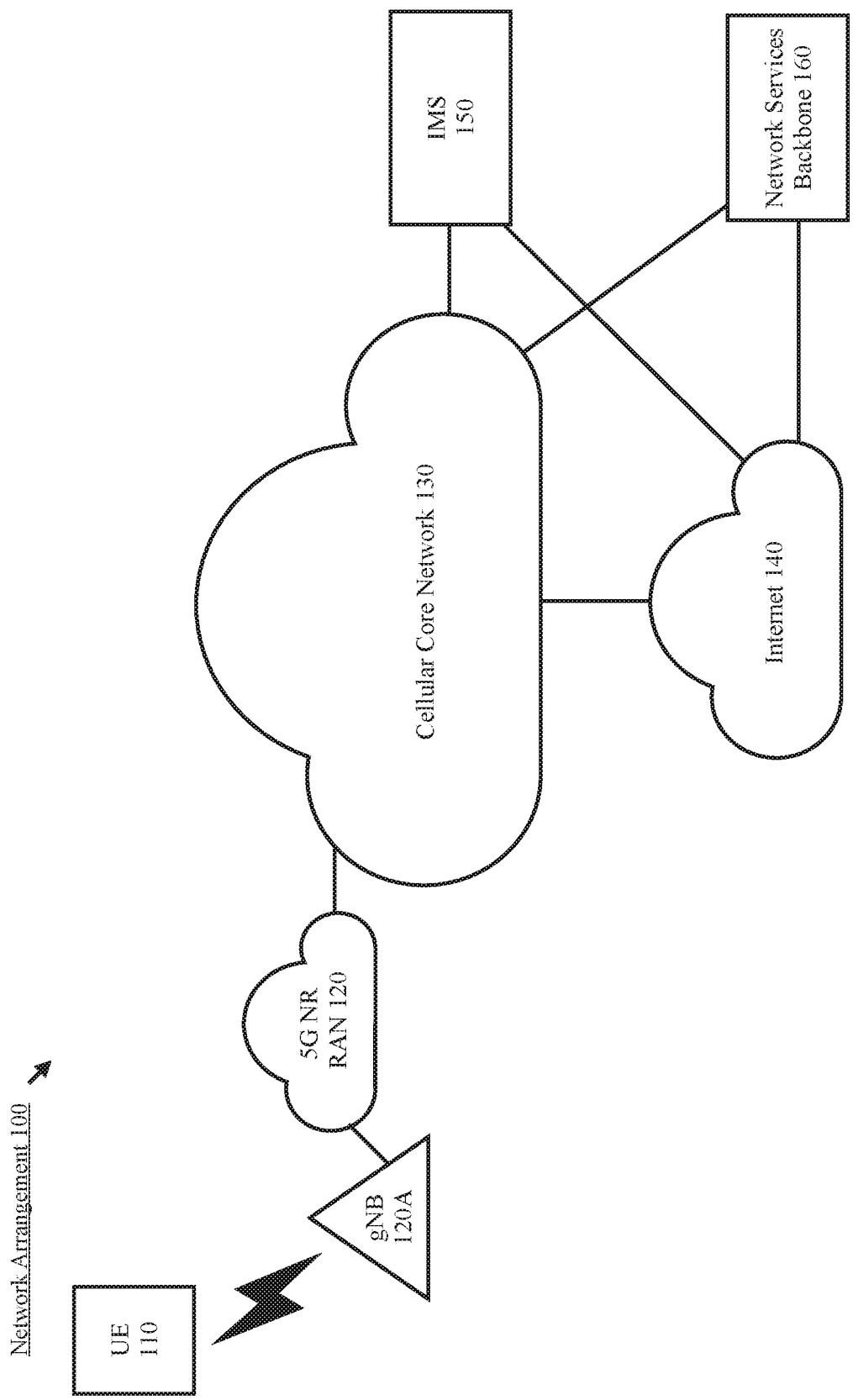
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to slice based random access channel (RACH) configurations and/or access barring mechanisms.

The exemplary embodiments are described with regard to a UE. However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any electronic component.

The exemplary embodiments are also described with regard to a fifth generation (5G) network that supports network slicing. Generally, network slicing refers to a network architecture in which multiple end-to-end logical networks run on a shared physical network infrastructure. Each network slice may be configured to provide a particular set of capabilities and/or characteristics. Thus, the physical infrastructure of the 5G network may be sliced into multiple virtual networks, each configured for a different purpose.

Those skilled in the art will understand that 5G may support a variety of different use cases, e.g., enhanced mobile broadband (eMBB), enhanced machine type communication (eMTC), industrial internet of things (IIoT), etc. Each type of use case may relate to various different types of applications and/or services. A network slice may be characterized by a type of use case, a type of application and/or service or the entity that provides the application and/or service via the network slice. However, any example in this description that characterizes a network slice in a specific manner is only provided for illustrative purposes. Throughout this description, reference to a network slice may represent any type of end-to-end logical network that is configured to serve a particular purpose and implemented on the 5G physical infrastructure.

The UE may be configured to perform any of a wide variety of different tasks. Thus, the UE may be configured to utilize one or more network slices. For example, the UE may utilize a first network slice for carrier services (e.g., voice, multimedia messaging service (MMS), Internet, etc.) and another network slice for a service provided by a third-party. To provide an example, the third-party may be the manufacturer of the UE that provides services such as, but not limited to, messaging, streaming multimedia, video calls, etc. In another example, the third-party may be an entity managing a digital platform (e.g., social media, e-commerce, streaming media, etc.). In a further example, the third-party may be an entity providing services for Internet of Things (Iot) devices.

As indicated above, a network slice may serve a wide variety of different purposes. However, the configured purpose of a network slice is beyond the scope of the exemplary embodiments. The exemplary embodiments are not limited to any particular type of network slice. Instead, the exemplary embodiments relate to introducing techniques to enable slice specific random access channel (RACH) configurations and slice specific access barring mechanisms.

Those skilled in the art will understand that a network slice may include a radio access network (RAN) slice and a core network slice. Throughout this description, the term "network slice" or "slice" may refer to a RAN slice and/or a corresponding core network slice.

A network slice may be identified by single network slice selection assistance information (S-NSSAI). Each instance of S-NSSAI may be associated with a public land mobile network (PLMN) and may include the slice service type (SST) and a slice descriptor (SD). The SST may identify the expected behavior of the corresponding network slice with regard to services, features and characteristics. Those skilled in the art will understand that the SST may be associated with a standardized SST value. The SD may identify any one or more entities associated with the network slice. For example, the SD may indicate an owner or an entity that manages the network slice (e.g., carrier) and/or the entity that the is providing the application/service via the network slice (e.g., a third-party, the entity that provides the application or service, etc.). In some embodiments, the same entity may own the slice and provide the service (e.g., carrier services). Throughout this description, S-NSSAI refers to a single network slice and NSSAI may generally refer to one or more network slices.

As mentioned above, the exemplary embodiments relate to slice based RACH configurations and/or access barring mechanisms. Those skilled in the art will understand that there may be different physical random access channel (PRACH) configurations (e.g., transmission occasions, time, frequency, preambles, etc.) for different network slices or slice groups. The UE 110 may select the PRACH resources for the RACH procedure based on the association between a network slice the UE intends to utilize and a set of PRACH resources. The exemplary embodiments include techniques for PRACH resource selection for a RACH procedure. As will be described in detail below, some of the exemplary embodiments relate to RACH procedures triggered by a non-slice service (e.g., access stratum (AS) triggered RACH).

In a further aspect, the exemplary embodiments include techniques for handling a collision scenario in which slice specific random access prioritization and legacy random access prioritization are configured. All of these exemplary aspects will be described in detail below. The exemplary techniques described herein may be utilized in conjunction with currently implemented slice based RACH configurations and/or access barring mechanisms, future implementations of slice based RACH configurations and/or access barring mechanisms or independently from other techniques related to slice based RACH configurations and/or access barring mechanisms.

FIG. 1 shows an exemplary network arrangement 100 according to various exemplary embodiments. The network arrangement 100 include a UE 110. Those skilled in the art will understand that the UE 110 may be any type of electronic component that is configured to communicate via a network, e.g., mobile phones, tablet computers, desktop computers, smartphones, phablets, embedded devices, wearables, IoT devices, eMTC devices, IIOT devices, MBB devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network arrangement 100, the network with which the UE 110 may wirelessly communicate is a fifth generation (5G) new radio (NR) radio access network (RAN) 120. However, the UE 110 may also communicate with other types of networks (e.g., 5G cloud RAN, a next generation RAN (NG-RAN), long term evolution (LTE) network, a legacy cellular network, a wireless local area network (WLAN), etc.) and the UE 110 may also communicate with networks over a wired connection. Therefore, in this example, the UE 110 may have a 5G NR chipset to communicate with the 5G NR RAN 120.

The 5G NR-RAN 120 may be a portion of cellular networks that may be deployed by cellular providers (e.g., Verizon, AT&T, T-Mobile, etc.). The networks 120 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

In network arrangement 100, the 5G NR RAN 120 is shown with a gNB 120A. However, an actual network arrangement may include any number of different types of base stations or cells deployed by any number of RANs. Thus, the example of a single 5G NR RAN 120 and gNB 120A is merely provided for illustrative purposes.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific cell or base station (e.g., gNB 120A).

The network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. It may include the evolved packet core (EPC) and/or the fifth generation core (5GC). The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
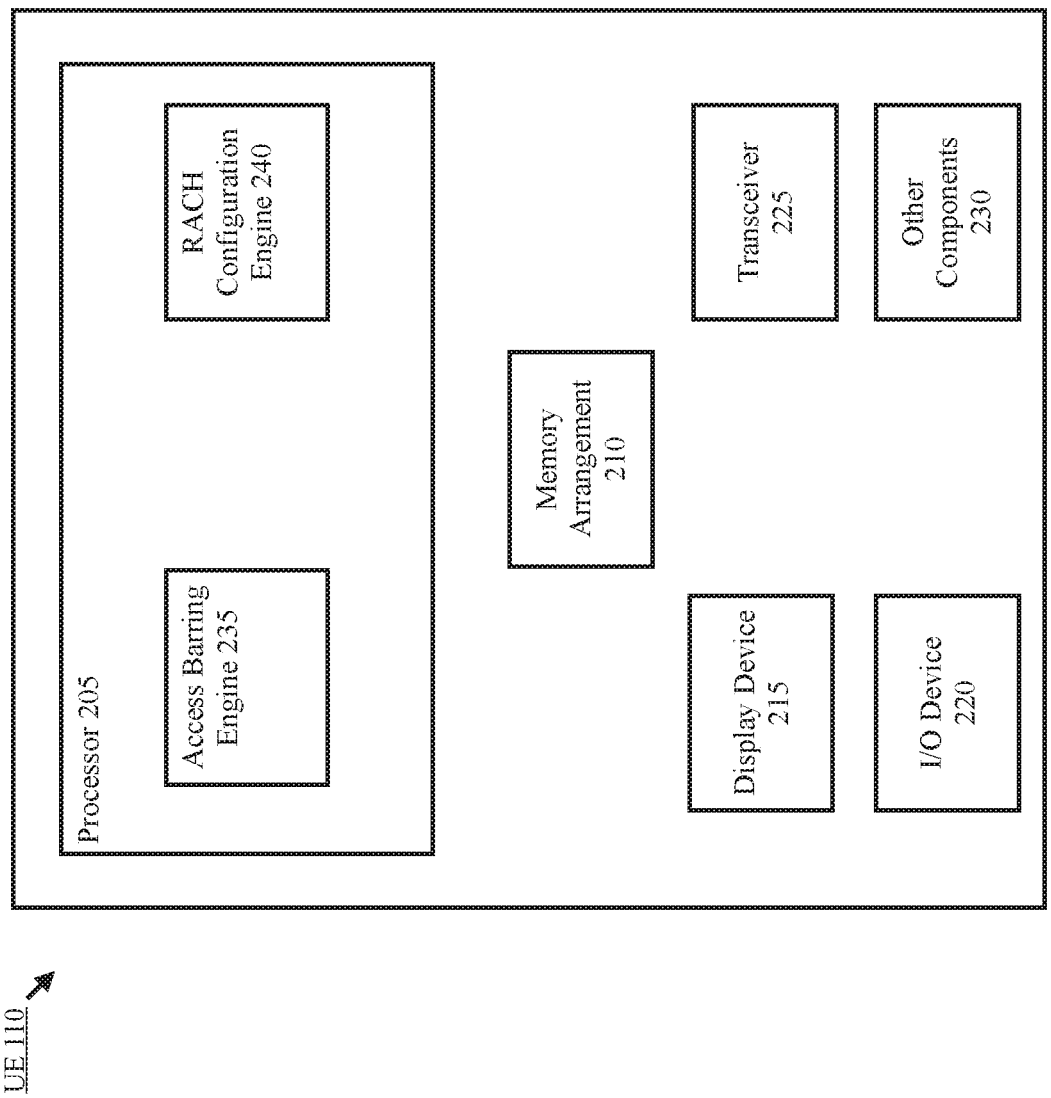
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may include a processor 205, a memory arrangement 210, a display device 215, an input/output (I/O) device 220, a transceiver 225 and other components 230. The other components 230 may include, for example, an audio input device, an audio output device, a power supply, a data acquisition device, ports to electrically connect the UE 110 to other electronic devices, etc.

The processor 205 may be configured to execute a plurality of engines of the UE 110. For example, the engines may include an access barring engine 235 and a RACH configuration engine 240. The access barring engine 235 may perform operations related to determining whether access to a base station, a cell and/or network slice is permitted. The RACH configuration engine 240 may perform operations related to determining and operating in accordance with the RACH configuration associated with the network slice the UE 110 intends to utilize.

The above referenced engines 235, 240 being applications (e.g., a program) executed by the processor 305 is merely provided for illustrative purposes. The functionality associated with the engines 235, 240 may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120 and/or any other appropriate type of network. Accordingly, the transceiver 225 may operate on a variety of different frequencies or channels (e.g., set of consecutive frequencies).

Figure 3:
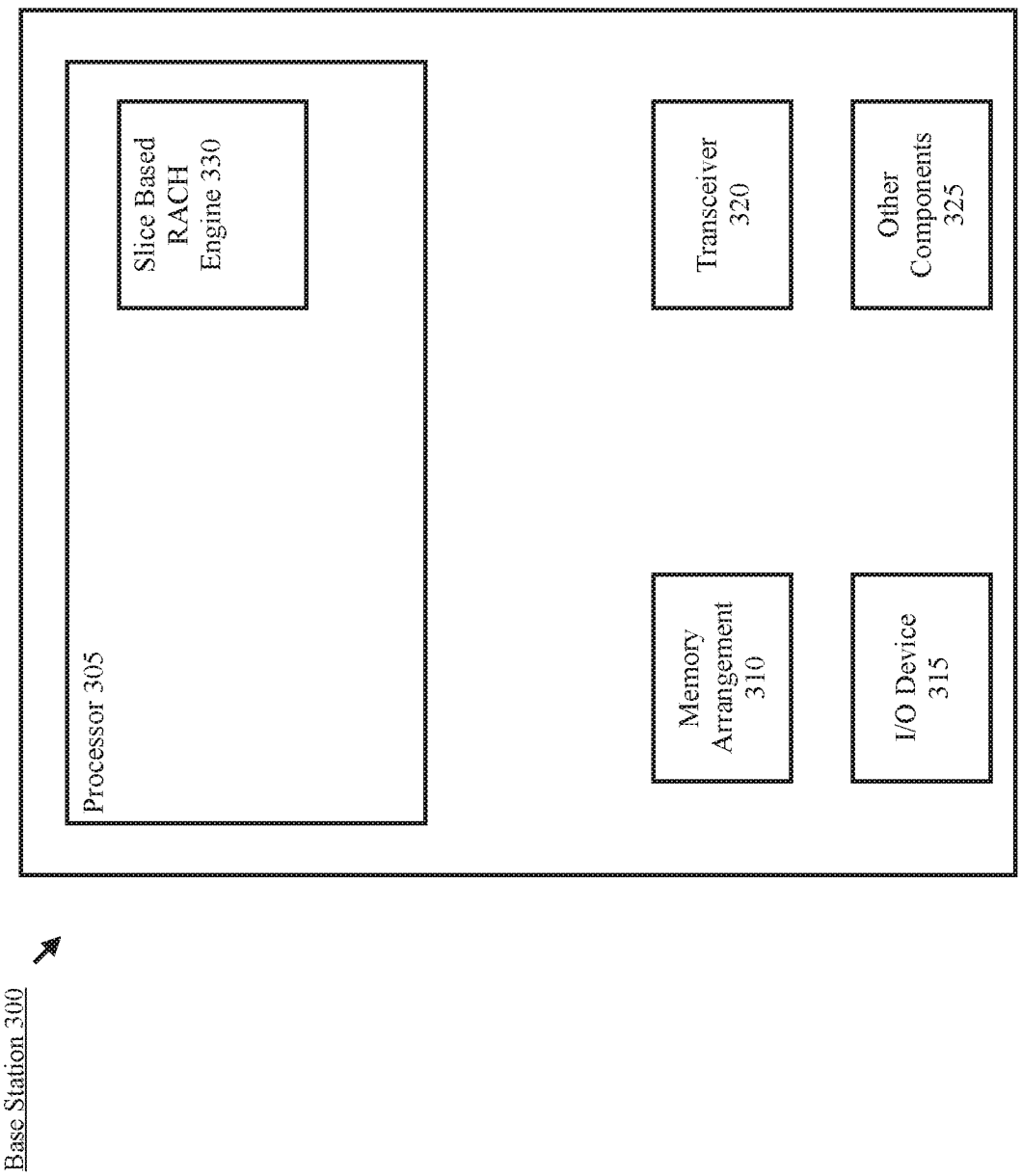
FIG. 3 shows an exemplary base station according to various exemplary embodiments.

FIG. 3 shows an exemplary base station 300 according to various exemplary embodiments. The base station 300 may represent any access node (e.g., gNB 120A, etc.) through which the UE 110 may establish a connection and manage network operations. Thus, throughout this description the terms base station, cell and/or gNB may be used interchangeably to describe access nodes.

The base station 300 may include a processor 305, a memory arrangement 310, an input/output (I/O) device 315, a transceiver 320, and other components 325. The other components 325 may include, for example, a battery, a data acquisition device, ports to electrically connect the base station 300 to other electronic devices, etc.

The processor 305 may be configured to execute a plurality of engines of the base station 300. For example, the engines may include a slice based RACH engine 330. The slice based RACH engine 330 may perform various operations related to slice based RACH configurations and/or access barring mechanisms. These operations may include but are not limited to, transmitting access barring information, receiving information over the RACH, transmitting information over the RACH and facilitating a connection between the UE 110 and one or more network slices.

The above noted engine 330 being an application (e.g., a program) executed by the processor 305 is only exemplary. The functionality associated with the engine 330 may also be represented as a separate incorporated component of the base station 300 or may be a modular component coupled to the base station 300, e.g., an integrated circuit with or without firmware. For example, the integrated circuit may include input circuitry to receive signals and processing circuitry to process the signals and other information. In addition, in some base stations, the functionality described for the processor 305 is split among a plurality of processors (e.g., a baseband processor, an applications processor, etc.). The exemplary embodiments may be implemented in any of these or other configurations of a base station.

The memory 310 may be a hardware component configured to store data related to operations performed by the base station 300. The I/O device 315 may be a hardware component or ports that enable a user to interact with the base station 300. The transceiver 320 may be a hardware component configured to exchange data with the UE 110 and any other UE in the system 100. The transceiver 320 may operate on a variety of different frequencies or channels (e.g., set of consecutive frequencies). Therefore, the transceiver 320 may include one or more components (e.g., radios) to enable the data exchange with the various networks and UEs.

FIG. 4 shows a method 400 for implementing various exemplary techniques related to slice based RACH configurations and/or access barring mechanisms. The method 400 will be described with regard to the network arrangement 100 of FIG. 1 and the UE 110 of FIG. 2.

As will be described in more detail below, one or more exemplary techniques may be related to aspects of unified access control (UAC). Those skilled in the art will understand that UAC is a UE 110 based access barring mechanism that may be utilized prior to a RACH procedure.

In 405, the UE 110 collects information to perform an access barring procedure for a target cell (e.g., gNB 120A). An access barring procedure may be triggered when the UE 110 wants to transition to the radio resource control (RRC) connected state or in response to any other appropriate type of predetermined condition.

The exemplary embodiments introduce the concept of utilizing access identities to define a slice group. The term "access identity" refers to a UAC parameter. This UAC parameter is being used in an unconventional way to indicate the NSSAI associated with the same PRACH configuration, e.g., transmission occasions, time, frequency, preambles, etc.

FIG. 5 shows an example of standardized access identities arranged by access identity number. In some embodiments, a set of one or more access identities may be associated with the same PRACH configuration, e.g., transmission occasions, time, frequency, preambles, etc. Thus, the set of access identities may represent a slice group because the network slices (e.g., NSSAI) corresponding to the access identities within the set are associated with the same PRACH configuration.

Accordingly, collecting information to perform an access barring procedure may include retrieving an indication of an access identity associated with the UE 110. This indication may be stored in the SIM or in any other appropriate location. In addition, collecting information to perform an access barring procedure may include receiving information from the network indicating one or more access identities supported by the target cell. The UE 110 may determine the types of access categories supported by the target cell based on a master information block (MIB), a system information block (SIB), a previous instance of RRC signaling or any other appropriate basis.

In some scenarios, access categories may be used to define slice groups. The term "access category" also refers to a UAC parameter. FIG. 6 shows an example of standardized access categorizes arranged by access category number. A set of one or more access categories may be associated with the same PRACH resources. Thus, the set of access categories may represent a slice group because the network slices (e.g., NSSAI) corresponding to these access identities are associated with the same PRACH configuration.

Accordingly, collecting information to perform an access barring procedure may include retrieving an indication of an access category associated with the UE 110. This indication may be stored in the SIM of the UE 110 or in any other appropriate location. In addition, collecting information to perform an access barring procedure may include receiving information from the network indicating the one or more access categories supported by the target cell. The UE 110 may also determine the types of access categories supported by the target cell based on transmissions from the cell, e.g., a master information block (MIB), a system information block (SIB), a previous instance of RRC signaling or any other appropriate basis.

The target cell may broadcast information that indicates which s-NSSAI/NSSAI are or are not accessible via the target cell. Accordingly, collecting information to perform an access barring procedure may include determining the s-NSSAI/NSSAI that the UE 110 intends to utilize and the s-NSSAI/NSSAI that are or are not accessible via the cell. In some scenarios, NSSAI may be used to define slice groups. For example, a set of NSSAI may represent a slice group because the set of NSSAI may be associated with the same PRACH resources.

In some embodiments, the slice grouping mechanisms described above may be specific to non-access stratum (NAS) data triggered RACH procedures. In addition, there may be separate slice groups for access stratum (AS) triggered RACH. However, any reference to a RACH procedure being triggered in a particular manner is merely provided for illustrative purposes. The exemplary techniques may be utilized in conjunction with any appropriate type of RACH procedure.

In 410, the UE 110 may perform the accessing barring check. For example, the UE 110 may determine whether the UE 110 and the target cell are associated with the same access identity. In another example, the UE 110 may determine whether the UE 110 and the target cell are associated with the same access category. In a further example, the UE 110 may determine whether a particular s-NSSAI or NSSAI that the UE 110 intends to access is supported by the target cell.

In this example, it may be considered that the access barring procedure is successful. Thus, the UE 110 may perform a RACH procedure in 415. However, in an actual deployment scenario, if the access barring procedure indicates that an access identify associated with the UE 110 is barred, an access category associated with the UE 110 is barred and/or a particular s-NSSAI or NSSAI that the UE 110 intends to access is not supported by the target cell, the access check may be unsuccessful. As a result, the UE 110 may search for a different target cell.

In 415, the UE 110 and the target cell may participate in a RACH procedure. As indicated above, the UE 110 may select PRACH resources for the RACH procedure based on the association between the one or more network slices the UE 110 intends to utilize and a particular PRACH configuration, e.g., transmission occasions, time, frequency, preambles, etc. In other words, there may be separate PRACH configurations per network slice or slice group.

To provide an example, to access a first RAN slice via the cell, a first set of PRACH resources (e.g., time and frequency domain) may be used for the transmission of the PRACH preamble. To access a second RAN slice via the cell, a second different set of PRACH resources may be used for the transmission of the PRACH preamble. If a slice grouping mechanism is utilized, the first set of PRACH resources may be associated with a first slice group and the second set of PRACH resources may be associated with a second different slice group. Thus, separate and distinct PRACH resources may be used to access different RAN slices on the same cell.

To provide another example, to access a first RAN slice via the cell, a first PRACH preamble sequence may be utilized during the RACH procedure. To access a second RAN slice, a second different PRACH preamble sequence may be utilized during the RACH procedure. If a slice grouping mechanism is utilized, the first PRACH preamble may be associated with a first slice group and the second PRACH preamble may be associated with a second different slice group. Thus, separate and distinct PRACH preamble sequences may be used to access different RAN slices on the same cell.

The PRACH configuration may also include timers or back off indicators (BIs) per RAN slice or slice group. Those skilled in the art will understand that these timing mechanisms may be used to indicate when a subsequent random access request may be transmitted. Further, since resource partitioning may be based on a RAN slice or a slice group, these timing mechanisms may be used to avoid collisions between random access requests associated with different RAN slices.

For example, based on the PRACH resource selected by the UE 110 to transmit the PRACH preamble, the cell may identify which network slice the UE 110 intends to access. Thus, the cell may select the back off timer parameters for the corresponding RAN slice (or slice group) and indicate the back off timer parameters to the UE 110 in the random access response (RAR). If a subsequent random access request is used, the UE 110 may transmit the subsequent random access request in accordance with the back off timer parameters (e.g., expiration of the timer, a threshold value is satisfied, etc.).

In other embodiments, a BI scaling factor may be implemented for each PRACH resource set. For example, based on the PRACH resource selected by the UE 110 to transmit the PRACH preamble, the cell may identify which network slice the UE 110 intends to access. Thus, the cell may select the corresponding BI scaling factor for the corresponding RAN slice (or slice group) and indicate the BI scaling factor to the UE 110 in the RAR. If a subsequent random access request is used, the UE 110 may transmit the subsequent random access request in accordance with a timing parameter derived from the BI scaling factor.

In addition, the RACH resource configuration scheme may be flexible to enable independent and common configurations for 2-step RACH resources and 4-step RACH resources with regard to multiple network slices and/or slice groups. The exemplary embodiments may also implement an independent configuration for whether 2-step RACH is allowed for each network slice or slice group. Further, the received signal receive power (RSRP) threshold for 2-step/4-step RACH selection may have an independent or common configuration for each network slice or slice group. Accordingly, there may be a scenario in which a particular slice group is associated with two or more of 2-step RACH resources specific to the slice group, 2-step RACH resources common to multiple slice groups, 4-step RACH resources specific to the slice group and 4-step RACH resources common to multiple slice groups.

In the example of the method 400, it may be considered that the RACH procedure is successful. However, if the RACH procedure fails, the UE 110 may reattempt the RACH procedure or search for a different cell to camp on. In 420, the UE 110 establishes an RRC connection with the cell (e.g., gNB 120A). When connected, the UE 110 may access one or more network slices via the cell.

As mentioned above, the exemplary embodiments include techniques for handling a collision scenario in which both slice specific random access prioritization and legacy random access prioritization are configured. To provide an example, the UE 110 may be configured for multimedia priority services (MPS) and/or mission critical services (MCS). As shown in FIG. 5, MPS corresponds to access identity number 1 and MCS corresponds to access identity number 2. In addition, as shown in FIG. 6, access attempts for emergency services correspond to access category number 2. During operation, if MPS/MCS access identity triggers traffic belonging to a specific network slice which is also configured with a set of RACH prioritization parameters, the UE 110 may have to determine how to operate in view of these conflicting RACH configurations. Similarly, if emergency service access category triggers traffic belonging to a specific network slice which is also configured with a set of RACH prioritization parameters, the UE 110 may have to determine how to operate in view of these conflicting RACH configurations. For example, it may not be possible for the network implementation to provide non-conflicting configurations. The exemplary embodiments include techniques for handling a collision scenario when there are conflicting configurations between slice specific random access prioritization and legacy random access prioritization.

In one approach, the network may indicate which configuration to utilize if there is a collision in time between traffic associated with these conflicting RACH configurations. Thus, within the context of the method 400, in 415, the UE 110 may select RACH and PRACH resources associated with the network slice or slice group for the RACH procedure if the network explicitly or implicitly indicates that the slice specific RACH configuration is to be prioritized over the legacy RACH configuration. Alternatively, the UE 110 may select RACH and PRACH resources associated with the legacy RACH configuration (e.g., MPS, MCS, emergency services, etc.) if the network indicates that the legacy RACH configuration is to be prioritized over the slice specific RACH configuration.

In another approach, the UE 110 may always use the optimal configuration between the conflicting configurations. For example, select a configuration based on which one of the configurations has the earliest RACH opportunity or the configuration with the most frequency RACH opportunities. The UE 110 may consider these factors and any other appropriate type of factor when one of the configurations.

In another approach, MPS, MCS and emergency services may be configured as a network slice or slice group. Thus, the access identities corresponding to MPS, MCS and emergency services may be associated with the same PRACH resources. As mentioned above, the exemplary embodiments introduce the concept of utilizing access identities to define a slice group.

The exemplary embodiments also include techniques for AS triggered RACH. The exemplary techniques described herein for AS triggered RACH do not coincide with the exemplary embodiments described above with regard to separate groups for AS triggered RACH.

Under conventional circumstances, AS triggered RACH procedures may not be slice specific. Thus, there may be no way to prioritize RACH procedures triggered for purposes such as, but not limited to, RRC connection re-establishment, request for other system information, RAN based notification area (RNA) updates, beam failure recovery and buffer status reports (BSR). However, any reference to a particular purpose for an AS triggered RACH procedure is merely provided for illustrative purposes. The exemplary embodiments may apply to any appropriate AS triggered or non-slice service RACH procedure.

In one approach, one or multiple separate RACH configurations for AS triggered purposes may be introduced. Thus, there may be one or multiple separate RACH configurations for purposes such as, but not limited to, RRC connection re-establishment, request for other system information, RNA updates, BFR and BSR. To provide an example, when a RACH procedure is triggered for RRC connection re-establishment the UE 110 may be configured to utilize a first set of RACH and PRACH resources and when a RACH procedure is triggered for a different purpose (e.g., BFR, BSR, etc.), the UE 110 may be configured to utilize a second different set of RACH and PRACH resources.

In another approach, the UE 110 may rely on the network slice (e.g., protocol data unit (PDU) sessions) configurations to determine the slice ID for AS triggered RACH. The UE 110 may select the prioritized RACH resource among multiple resources if the UE 110 is configured with multiple network slices. To provide an example, for RRC re-establishment, the UE 110 may rely on the network slices (e.g., PDU session) in a previous connection to determine the PRACH resource for re-establishment triggered RACH. To provide another example, for other AS triggered RACH in connected states, the UE 110 may use current slices (e.g., PDU session) to determine the PRACH resource.

Figure 7:
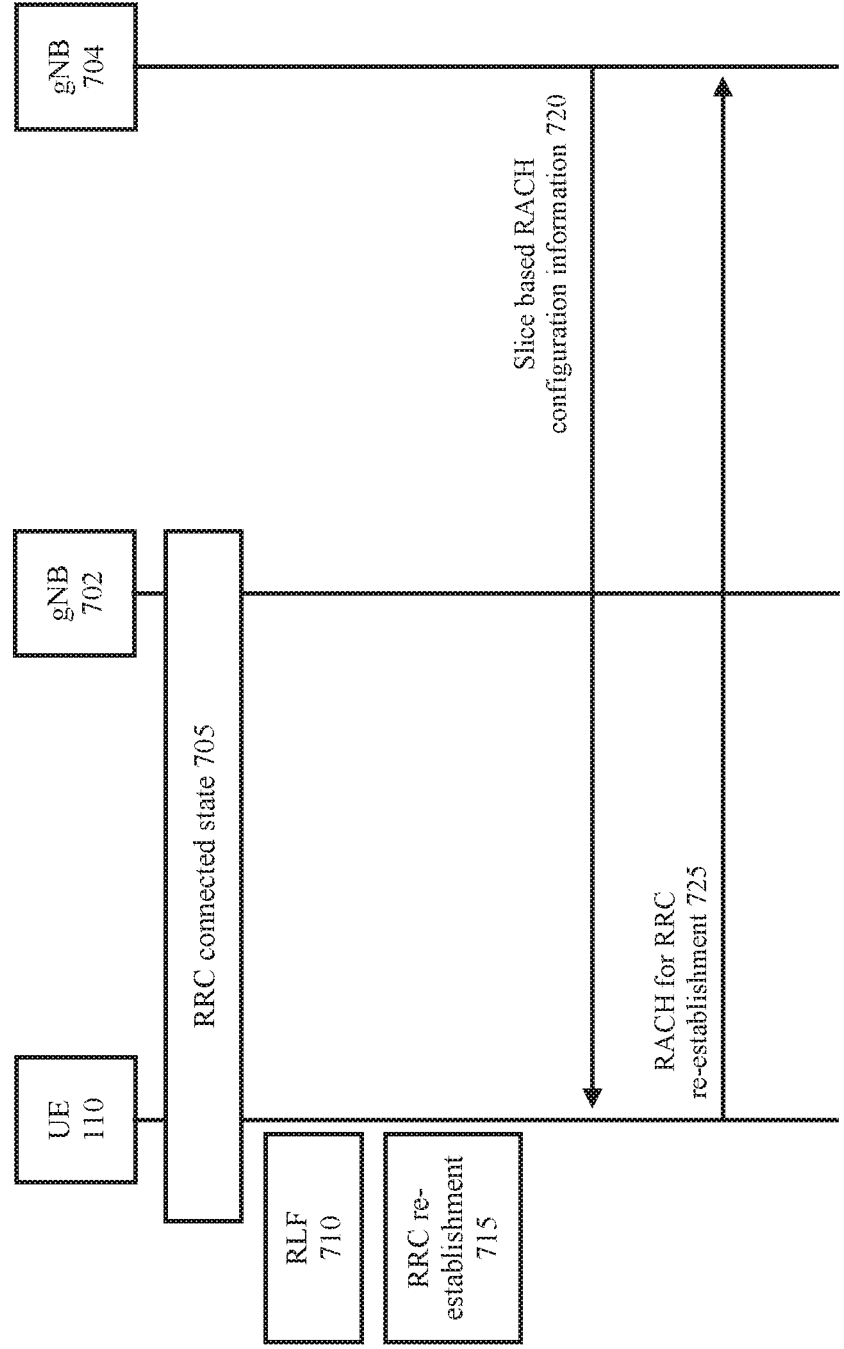
FIG. 7 shows a signaling diagram for access stratum (AS) triggered RACH for radio resource control (RRC) connection re-establishment according to various exemplary embodiments.

FIG. 7 shows a signaling diagram 700 for AS triggered RACH for RRC connection re-establishment according to various exemplary embodiments. The signaling diagram 700 includes the UE 110, a first gNB 702 and a second gNB 704.

In 705, the UE 110 is in the RRC connected state while camped on the gNB 702. In this example, a first network slice (e.g., slice A) and a second network slice (e.g., slice B) are in operation.

In 710, a radio link failure (RLF) is detected. In 715, RRC re-establishment is triggered where the second gNB 704 is the target cell for the RRC re-establishment.

In 720, the UE 110 receives system information (e.g., system information block (SIB), master information block (MIB), etc.) comprising slice based RACH configuration information. This information may indicate to the UE 110 whether the RACH resources for slice A or the RACH resources for slice B are prioritized during a subsequent AS triggered RACH procedure.

In 725, a RRC re-establishment request is transmitted over the RACH to the second gNB 704. The RACH resources selected by the UE 110 to transmit the request may be associated with slice A or slice B depending on which slice is prioritized.

Figure 8:
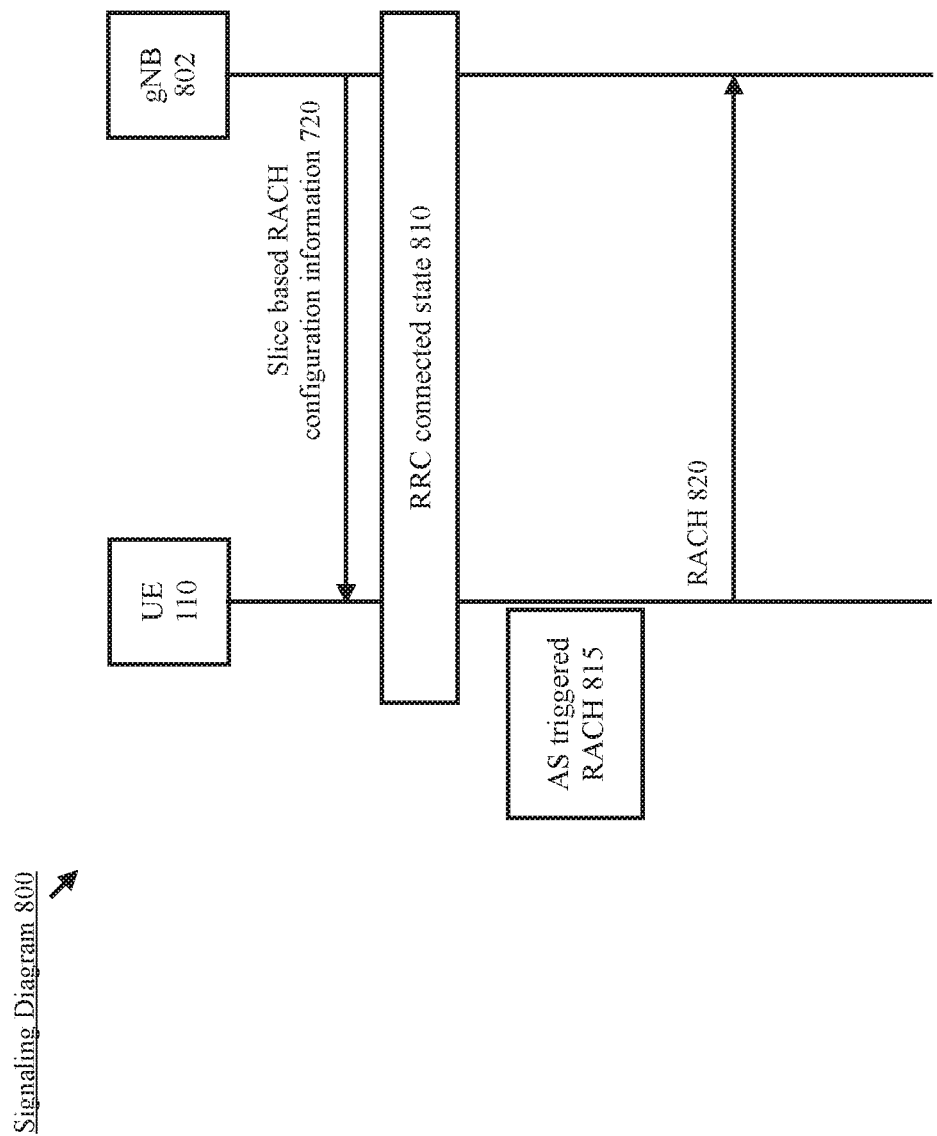
FIG. 8 shows a signaling diagram for AS triggered RACH for buffer status report (BSR), beam failure recovery (BFR) or radio link failure (RLF) according to various exemplary embodiments.

FIG. 8 shows a signaling diagram 800 for AS triggered RACH for BSR, BFR or RLF according to various exemplary embodiments. The signaling diagram 800 includes the UE 110 and a gNB 802.

In 805, the UE 110 receives slice based RACH configuration information from the gNB 802. This information may indicate to the UE 110 whether the RACH resources for slice A or the RACH resources for slice B are prioritized during a subsequent AS triggered RACH procedure.

In 810, the UE 110 is in the RRC connected state while camped on the gNB 802. In this example, a first network slice (e.g., slice A) and a second network slice (e.g., slice B) are in operation.

In 815, AS triggered RACH for BSR, BFR, RLF or any other appropriate purpose may be initiated. In 820, a signal is transmitted over the RACH to the qNB 802 for the RACH procedure. The RACH resources selected by the UE 110 to transmit the signal may be associated with slice A or slice B depending on which slice is prioritized.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A processor configured to:
    collect access barring information to perform an access barring procedure corresponding to a cell, wherein the information includes an access identity of a user equipment (UE);
    receive a slice specific random access prioritization configuration from the cell;
    receive a legacy random access prioritization configuration from the cell;
    perform the access barring procedure using the access barring information;
    select a random access prioritization configuration to use for a random access channel RACH) procedure from a set of the slice specific random access prioritization configuration and the legacy random access prioritization; and
    perform the RACH procedure with the cell using the selected random access prioritization configuration.

2. The processor of claim 1, wherein the access identity is included in a set of one or more access identities.

3. The processor of claim 1, wherein the access barring information further includes a network slice access stratum group of the UE.

4. The processor of claim 1, wherein selecting the random access prioritization configuration is based on an indication from the network.

5. The processor of claim 4, wherein the indication is a Boolean value.

6. The processor of claim 1, further configured to:
    identify a collision between the slice specific random access prioritization configuration and the legacy random access prioritization configuration.

7. A user equipment (UE), comprising:
    a transceiver configured to communicate with a network; and a processor communicatively coupled to the transceiver and configured to:
collect access barring information to perform an access barring procedure corresponding to a cell, wherein the information includes an access identity of the UE;
receive a slice specific random access prioritization configuration from the cell;
receive a legacy random access prioritization configuration from the cell;
perform the access barring procedure using the access barring information;
select a random access prioritization configuration to use for a random access channel (RACH) procedure from a set of the slice specific random access prioritization configuration and the legacy random access prioritization; and
perform the RACH procedure with the cell using the selected random access prioritization configuration.

8. The UE of claim 7, wherein the access identity is included in a set of one or more access identities.

9. The UE of claim 7, wherein the access barring information further includes a network slice access stratum group of the UE.

10. The UE of claim 7, wherein selecting the random access prioritization configuration is based on an indication from the network.

11. The UE of claim 10, wherein the indication is a Boolean value.

12. The UE of claim 7, wherein the processor is further configured to:
identify a collision between the slice specific random access prioritization and the legacy random access prioritization.

13. A method, comprising:
collecting access barring information to perform an access barring procedure corresponding to a cell, wherein the information includes an access identity of a user equipment (UE);
receiving a slice specific random access prioritization configuration from the cell;
receiving a legacy random access prioritization configuration from the cell;
performing the access barring procedure using the access barring information;
selecting a random access prioritization configuration to use for a random access channel (RACH) procedure from a set of the slice specific random access prioritization configuration and the legacy random access prioritization; and
performing the RACH procedure with the cell using the selected random access prioritization configuration.

14. The method of claim 13, wherein the access identity is included in a set of one or more access identities.

15. The method of claim 13, wherein the information further includes a network slice access stratum group of the UE.

16. The method of claim 13, wherein selecting the random access prioritization configuration is based on an indication from the network.

17. The method of claim 16, wherein the indication is a Boolean value.

18. The method of claim 13, the method further comprising:
identifying a collision between the slice specific random access prioritization and the legacy random access prioritization.

* * * * *